United States Patent

Kobayashi et al.

Patent Number: 4,481,607
Date of Patent: Nov. 6, 1984

[54] ELECTRONIC DICTIONARY

[75] Inventors: Saburo Kobayashi; Takao Yoshida, both of Tokyo, Japan

[73] Assignee: Casio Computer Co., Ltd., Tokyo, Japan

[21] Appl. No.: 331,582

[22] Filed: Dec. 17, 1981

[30] Foreign Application Priority Data

Dec. 25, 1980 [JP] Japan .................. 55-184441

[51] Int. Cl.³ .................. G06F 15/14; G06F 15/02
[52] U.S. Cl. .................. 364/900
[58] Field of Search .................. 364/200, 900

[56] References Cited

U.S. PATENT DOCUMENTS

| 3,932,859 | 1/1976 | Kyriakides | 364/900 |
| 4,117,542 | 9/1978 | Klusner | 364/900 |
| 4,159,536 | 6/1979 | Kehoe et al. | 364/900 |
| 4,218,760 | 8/1980 | Levy | 364/900 |
| 4,339,806 | 7/1982 | Yoshida | 364/900 |

FOREIGN PATENT DOCUMENTS

| 2854837 | 8/1979 | Fed. Rep. of Germany . | |
| 1448211 | 2/1976 | United Kingdom . | |
| 2008818 | 6/1979 | United Kingdom . | |
| 2014765 | 8/1979 | United Kingdom | 364/900 |
| 2043975 | 10/1980 | United Kingdom . | |
| 1593334 | 7/1981 | United Kingdom . | |
| 2074354 | 10/1981 | United Kingdom . | |
| 2076194 | 11/1981 | United Kingdom . | |

*Primary Examiner*—Gareth D. Shaw
*Assistant Examiner*—Ronni S. Malamud
*Attorney, Agent, or Firm*—Frishauf, Holtz, Goodman & Woodward

[57] ABSTRACT

An electronic dictionary stores words of a first language and words of a second language, in a first dictionary memory and a second dictionary memory, respectively. The stored words in the first and second dictionary memories can be displayed selectively as source language words at a display section upon operation of a search key on a keyboard. Either a word of the first language or a word of the second language is displayed as a corresponding object language word on the display section, after the source language word displayed at the display section is translated in response to a translation instruction.

10 Claims, 13 Drawing Figures

FIG. 4

| | 20a | 20b |
|---|---|---|
| EI 1 | ( A = 124 W ) | EW 1 |
| EI 2 | ( B = 107 W ) | EW 125 |
| ⁓ | ⁓ | ⁓ |
| EI 26 | ( Z = 1 W ) | EW 2209 |
| EW 1 | ( A ) | JW 1413 |
| ⁓ | ⁓ | ⁓ |
| EW 125 | ( BABY ) | JW 19 |
| ⁓ | ⁓ | ⁓ |
| EW 2209 | ( ZOO ) | JW 821 |

| | 21a | 21b |
|---|---|---|
| JI 1 | ( ア = 34 W ) | JW 1 |
| JI 2 | ( イ = 26 W ) | JW 35 |
| ⁓ | ⁓ | ⁓ |
| JI 44 | ( ワ = 21 W ) | JW 2189 |
| JW 1 | ( アイスル ) | EW 538 |
| ⁓ | ⁓ | ⁓ |
| JW 35 | ( イイエ ) | EW 1710 |
| ⁓ | ⁓ | ⁓ |
| JW 2189 | ( ワイン ) | EW 2164 |
| ⁓ | ⁓ | ⁓ |
| JW 2209 | ( ワ ン ) | EW 135 |

| | | | |
|---|---|---|---|
| (a) | AC | | E→J |
| (b) | IN · | A = 124 W | E→J |
| (c) | IN · | B = 107 W | E→J |
| (d) | ▼ ÷ | BABY | E→J |
| (e) | C | B = 107 W | E→J |
| (f) | ▲ − | AWAY | E→J |
| (g) | ▲ − | AWARE | E→J |
| (h) | ▼ ÷ | AWAY | E→J |
| (i) | ↓ | MOVE | E→J |
| (j) | TR = | ウゴク | E→J |
| (k) | E→J % | | J→E |
| (l) | IN · | ア = 34 W | J→E |
| (m) | ↓ | ウ = 41 W | J→E |
| (n) | ▼ ÷ | ウエ | J→E |
| (o) | ↓ | ウサギ | J→E |
| (p) | TR = | RABBIT | J→E |
| (q) | TR = | ウサギ | J→E |

FIG. 10

| | | | |
|---|---|---|---|
| (a) | AC | E→J | 0 |
| (b) | 2 | E→J | 2 |
| (c) | IN · | B=107W | E→J |
| (d) | 1 4 | E→J | 14 |
| (e) | IN · | N=52W | E→J |
| (f) | 1 2 | E→J | 12 |
| (g) | ▼ + | NEED | E→J |
| (h) | AC | E→J | 0 |
| (i) | 4 0 | E→J | 40 |
| (j) | ▼ + | AID | E→J |
| (k) | AC | E→J | 0 |
| (ℓ) | 2 5 | E→J | 25 |
| (m) | ▼ + | ADD | E→J |
| (n) | ▼ + | ADDRESS | E→J |
| (o) | 6 | E→J | 6 |
| (p) | ▼ + | ADVANTAGE | E→J |

FIG. 12

| | 20a | 20b |
|---|---|---|
| EI 1 | (A = 124 W) | EW 1 |
| EI 2 | (B = 107 W) | EW 125 |
| ⁏ | ⁏ | ⁏ |
| EI 26 | (Z = 1 W) | EW 2209 |
| EW 1 | (A ) | (ヒトツノ) |
| ⁏ | ⁏ | ⁏ |
| EW 125 | (BABY ) | (アカンボウ) |
| ⁏ | ⁏ | ⁏ |
| EW 2209 | (ZOO ) | (ドウブツエン) |

FIG. 13

| | 21a | 21b |
|---|---|---|
| JI 1 | (ア = 34 W) | JW 1 |
| JI 2 | (イ = 26 W) | JW 35 |
| ⁏ | ⁏ | ⁏ |
| JI 44 | (ワ = 21 W) | JW 2189 |
| JW 1 | EW 538 b | |
| ⁏ | ⁏ | |
| JW 35 | EW 1710 b | |
| ⁏ | ⁏ | |
| JW 2189 | EW 2164 b | |
| ⁏ | ⁏ | |
| JW 2209 | EW 135 b | 21b |

ELECTRONIC DICTIONARY

BACKGROUND OF THE INVENTION

The present invention relates to an electronic dictionary with an improved word search system.

An electronic dictionary has recently been introduced in which translation is performed between a plurality of languages, for example, between English and Japanese, in such a manner that a word in one language is translated into a corresponding word in another language and the corresponding word is displayed at a display section.

In a conventional electronic dictionary which deals with translation, for example, in the case involving Japanese, character keys for letters and kana character keys are arranged on a keyboard and a word is specified by the key-in operation. When word data is entered with the keys as described above in a system of an electronic dictionary, a word corresponding to the input word data is searched in the dictionary memory and the searched word is displayed at the display section. However, as may be apparent from the above example, a number of input keys for specifying a word are arranged. For example, even in an electronic dictionary which is disclosed in U.S. Pat. No. 3,932,859 and U.S. Pat. No. 4,159,536, character keys for letters are arranged on a keyboard, resulting in a device large in size and complex in operation.

SUMMARY OF THE INVENTION

It is an object of the present invention to solve the above problems and to provide an electronic dictionary with an improved word search system, wherein a desired word translation is performed and a translated word is displayed at a display section.

In order to achieve the above and other objects of the present invention, there is provided an electronic dictionary comprising dictionary memories which, respectively, store words of a first language and words of a second language; search means for searching a word of one of the first and second languages stored in a corresponding one of said dictionary memories in the order of storage upon operation of a search key and which displays the searched word at a display section; and means for displaying a translated word of the other of the first and second languages corresponding to the searched word displayed at said display section, in accordance with a translation instruction.

With the above arrangement, a number of character keys for letters and kana character keys which are conventionally arranged on the keyboard, need not be arranged in the electronic dictionary according to the present invention. A desired word is selected for display at the display section and translation thereof becomes possible, thus accomplishing a compact device and a control operation corresponding to the key-in operation is made simple.

BRIEF DESCRIPTION OF THE DRAWINGS

FIG. 4 is a view for explaining a storage condition of a storage area of a first dictionary memory of FIG. 2;

FIG. 5 is a view for explaining a storage condition of a storage area of a second dictionary memory of FIG. 2;

FIGS. 9a to q are views for explaining key-in operations and changes in display contents corresponding to the key-in operations when translation is performed to the initial search and word search modes;

FIGS. 10a to p are views for explaining key-in operations and changes in display contents corresponding to the key-in operations when the initial search and word search modes are performed by accessing addresses;

FIG. 12 is a view for explaining an example in which a storage content which is different from the storage content as shown in FIG. 4 is stored in a storage area in the first dictionary memory of FIG. 2; and FIG. 13 is a view for explaining an example in which a storage content which is different from the storage content shown in FIG. 5 is stored in a storage area in the second dictionary memory area of FIG. 2.

DETAILED DESCRIPTION OF THE PREFERRED EMBODIMENTS

Figure 1:
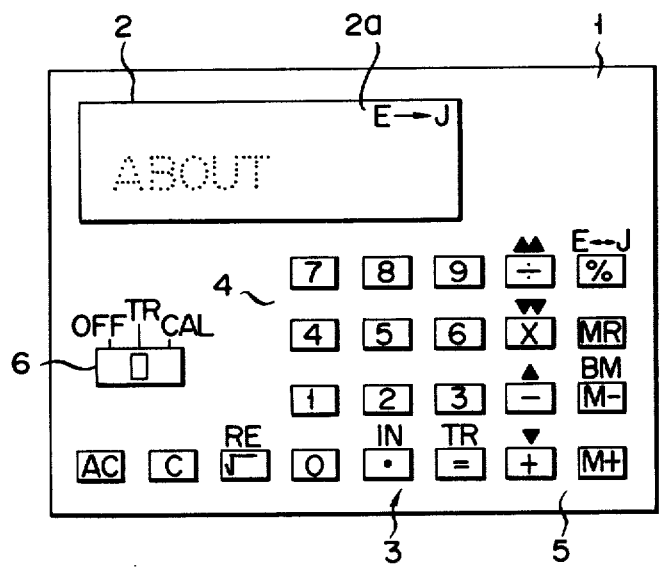
FIG. 1 is a front view of a case main body of an electronic dictionary according to one embodiment of the present invention.

An electronic dictionary according to one embodiment of the present invention will be described with reference to the accompanying drawings. FIG. 1 is a front view illustrating the outer appearance of the electronic dictionary. Referring to the figure, there is shown a case main body 1, one side, that is, the front side of which is furnished with a liquid crystal display section 2 having, for example, liquid crystal display elements and a keyboard 3. Each segment of the liquid crystal display section 2 is arranged by a dot matrix of 5×7 dots. Ten characters for 10 segments of the liquid crystal display section 2 are displayed at a maximum. A translation mode display unit 2a is arranged at the liquid crystal display section 2 to indicate translation modes such as translation from English to Japanese (E→J) and translation from Japanese to English (J→E). Further, ten keys "0" to "9", a decimal key, function keys 5 which specify a translation process, and a mode changeover switch 6 which switches one of a translation mode (TR) and a calculation mode (CAL) are arranged on the keyboard 3. The mode changeover switch 6 also functions as the power switch. The function keys 5 have different functions in different modes, which are switched by the mode changeover switch 6, that is, in the calculation and translation modes. In the calculation mode, the function keys 5 perform the original functions which are indicated on the keys. However, in the translation mode, the function keys 5 perform additional functions which are indicated above the keys on the keyboard 3. In particular, the function keys 5 in the translation mode perform the functions such as "E←→J", "TR", "IN", "RE", "▼", "▲", "▼▼", "▲▲" and "BM" to be described in detail later on. Symbol "E←→J" indicates a key for specifying a translation mode in which translation is performed from English to Japanese "E→J" or from Japanese to English "J→E". The translation mode is alternately switched from "J→E" to "E→J" or from "E→J" to "J→E". However, when the translation mode is switched by the mode changeover switch 6, the "E→J" mode is first initiated. When the "E←→J" key is depressed, the "E→J" mode is switched to the "J→E" mode. Symbol "TR" indicates a key which specifies translation. Symbol "IN" indicates a search key which reads out and displays initials (first characters; to be referred to as initials hereinafter), that is, A, B, C, ... in the "E→J" mode and ア, イ, ウ, エ, オ, ... in the "J→E" mode, from dictionary memories to be described later. Symbol "RE" indicates a search key which reads out and displays initials in the reverse order to the readout order specified by the "IN" key. Symbols "▼" and "▼▼" indicate keys for specifying the forward search of a word. When these keys are depressed instantaneously, searching is performed one word upon each depression. When the keys are continuously depressed for a predetermined period of time, for example, two or more seconds, words are searched at intervals of 0.5 or 0.25 second after 2 seconds. Symbols "▲" and "▲▲" indicate keys which are used for the reverse search. When the key is continuously depressed for 2 or more seconds, words are searched at intervals of 0.5 or 0.25 second after 2 seconds. Symbol "BM" indicates a bookmark key which functions as a bookmark during the operation of memorizing words from the beginning. With the single operation of the "BM" key, an address for a word which is being displayed is stored, and the stored word is accessed by "AC" and "BM" keys. The "MR" and "M+" keys have no functions in the translation mode. However, the "AC" (all clear) key, a "C" (clear) key and the ten keys retain the original functions.

The arrangement of the electronic circuit of the electronic dictionary will be described with reference to FIG. 2. A key input signal which is generated from the keyboard when data is entered with a key, is supplied to a key judging section 11. The key judging section 11 transfers the key input signal which is received therein to a control section 12 and judges the content of the signal. When the translation mode is specified, a signal a of level "1" is supplied from the key judging section 11 to a one-shot circuit 13 and an AND circuit 14. With an operation of the "E←→J" key, the key judging section 11 supplies a signal b of level "1" to the AND circuit 14. An output from the AND circuit 14 is supplied to a binary counter 15 as a count signal, and a one-shot pulse from the one-shot circuit 13 is supplied to the binary counter 15 as a reset signal. With an operation of the "AC" key, the key judging section 11 supplies a signal i to the binary counter 15 so that the binary counter 15 is reset. An output from the binary counter 15 is supplied to the control section 12. Further, the key judging section 11 outputs a signal c whose level becomes "1" only for a period in which the "IN" key is being depressed, a signal d whose level becomes "1" only for a period in which the "RE" key is being depressed, and signals e, f, g and h whose levels become "1" only for a period in which the search keys such as "▼", "▼▼", "▲" and "▲▲" are being depressed, respectively. These signals are supplied to a search control section 16 which is described in detail with reference to FIG. 2. Further, the control section 12 has output lines 12a to 12d. A control signal is supplied from the output line 12a to a display selection section 17. Operation data and a control signal in the calculation mode are supplied from the output line 12b to an operation/memory section 18. The control signals which are supplied from the output line 12a of the control section 12 to the display selection section 17 include ten key data and display data for "E→J" and J→E" in the translation mode. Further, the control section 12 supplies a control signal to an address decoder 19 and the ten key data, operation control data, read/write data and the like to a search control section 16 to be described later. Address data is supplied from the search control section 16 to a first dictionary memory 20 and a second dictionary memory 21 through the address decoder 19. The first and second dictionary memories 20 and 21 comprise, for example ROMs (read-only memories). English data is written in the first dictionary memory 20 and Japanese data is written in the second dictionary memory 21. As shown in FIG. 4, the first dictionary memory 20 has addresses EI1 to EI26 and EW1 to EW2209. First and second memory areas 20a and 20b are formed for each address. For the addresses EI1 to EI26, data for initials (data for the first letter of a word), that is, word numbers for words beginning with letters A to Z are stored in the first memory areas 20a. For example, when English words which begin with the letter A and which are stored in the first memory area 20a for the address EI1 number 124, data "A=124W" is written in the first memory area 20a corresponding to the address EI1. As for the addresses EW1 to EW2209, English words which number 2209 and which begin with letters A to Z are stored in the first memory area 20a in the order of A to Z. In the second memory areas 20b corresponding to the addresses EI1 to EI26, initial addresses of words which begin with A to Z are written. For example, "EW1" is written in the address EI1 as a corresponding address thereto when words beginning with the letter A start from the address EW1. Since the words beginning with the letter B start from the address EW 125, "EW125" is written in the address EI2 as a corresponding address thereto. In the second memory areas 20b corresponding to the addresses EW1 to EW2209, addresses for translated words corresponding to the respective English words which are stored in the second dictionary memory 21 are written. On the other hand, the second dictionary memory 21 has addresses JI1 to JI44 and JW1 to JW2209, as shown in FIG. 5. First and second memory areas 21a and 21b are formed for each address. For the addresses JI1 to JI44, data for initials (data for the first letter of a word), that is, word numbers for words beginning with kana characters ア to ン which usually comprise 50 characters (however, in this embodiment, 44 kana characters are used) are stored in the first memory areas 21a. As for the addresses JW1 to JW 2209, Japanese words which number 2209 and which begin with kana characters ア to ン are stored in the first memory areas 21a in the order of ア to ン. In the second memory areas 21b corresponding to the addresses JW1 to JW2209, addresses for translated words of English corresponding to the respective Japanese words which are stored in the first dictionary memory 21 are written. "EI", "EW", "JI" and "JW" are respectively written as code numbers.

Figure 2:
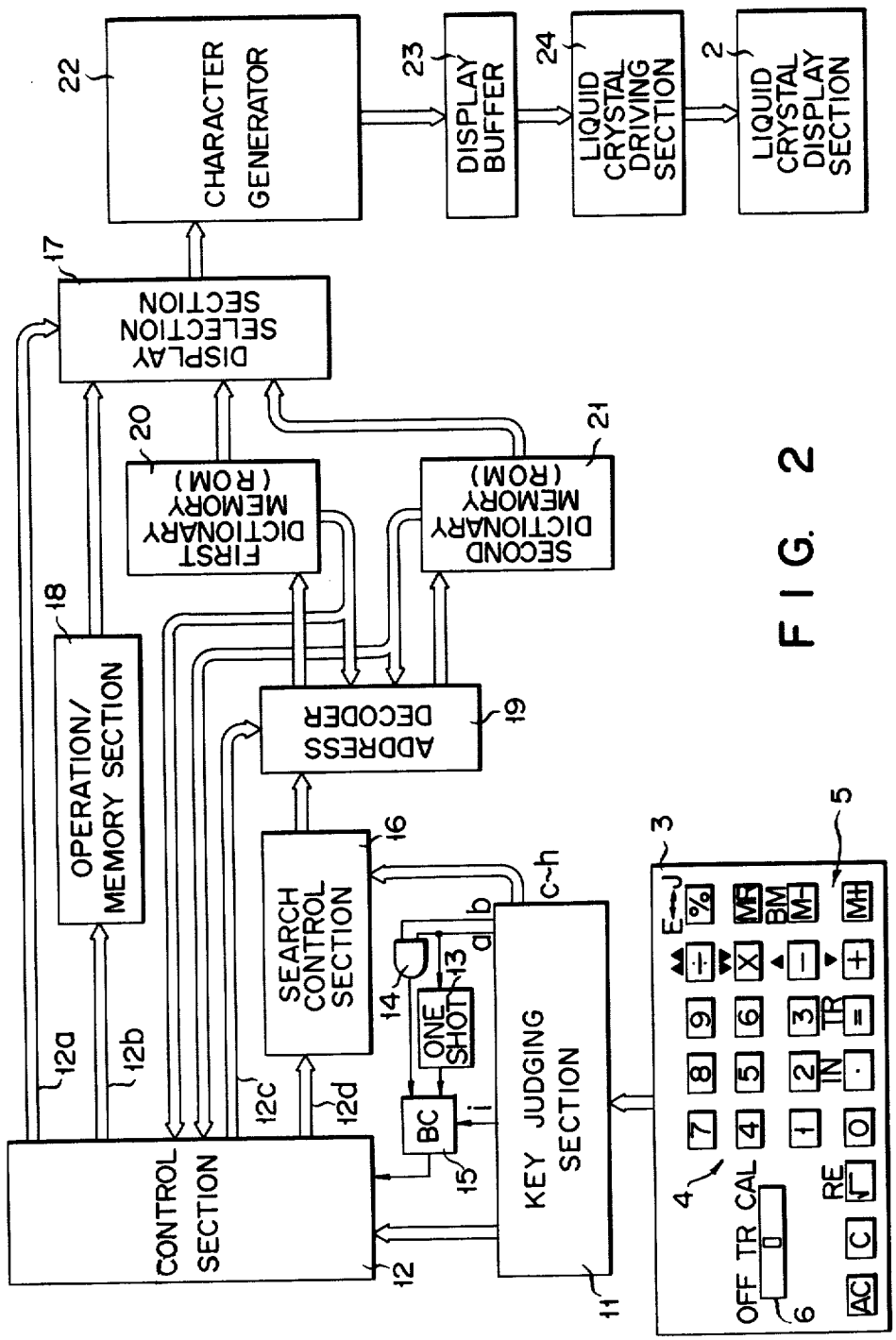
FIG. 2 is a circuit diagram of the electronic dictionary according to the above embodiment of the present invention.

Address data EW and JW which are read out from the second memory area 20b of the first dictionary memory 20 and address data JW and EW which are read out from the second memory area 21b of the second dictionary memory 21, are transmitted to the address decoder 19 and the control section 12, as shown in FIG. 2. Further, data which is read out from the first memory areas 20a and 21a of the first and second dictionary memories 20 and 21, respectively, is supplied to the display selection section 17. Further, data which is output from the operation/memory section 18 is supplied to the display selection section 17. The display selection section 17 selects input data in response to the control signal from the control section 12, and transfers it to a character generator 22. The character generator 22 generates a dot matrix pattern data corresponding to numbers, letters and kana characters in response to the input data and supplies the dot matrix pattern data to a liquid crystal drive section 24 through a display buffer 23. The liquid crystal drive section 24 drives the liquid crystal display section 2 in accordance with the data which is retained in the display buffer 23 and displays the numbers, letters and kana characters by the dot matrix pattern.

The search control section 16 of FIG. 2 will be described in detail with reference to FIG. 3. The key input signals c to h from the key judging section 11 are supplied to the search control section 16, through one-shot circuits $31_1$ to $36_6$ and delay circuits $32_1$ to $32_6$, respectively. The delay circuits $32_1$ to $32_6$ provide delay time of, for example, 2 seconds. When a signal of level "0" is input to the delay circuits $32_1$ to $32_6$, the delay circuits $32_1$ to $32_6$ do not supply an output. Outputs from the delay circuits $32_1$ to $32_6$ are input to AND circuits $33_1$ to $33_6$, respectively. Further, a clock pulse $\theta_1$ having a period of 0.5 seconds is supplied from a pulse generator 34 to the AND circuits $33_1$ to $33_3$ and $33_5$. A clock pulse $\theta_2$ having a period of 0.25 seconds is supplied to the AND circuits $33_4$ and $33_6$. Outputs from the one-shot circuit $31_1$ and the AND circuit $33_1$ are supplied to a "t1" end of an initial address counter 36 through an OR circuit 35a. Outputs from the one-shot circuit $31_2$ and the AND circuit $33_2$ are supplied to a "−1" end of the initial address counter 36 through an OR circuit 35b. Further, outputs from the one-shot circuits $31_3$ and $31_4$ and the AND circuits $33_3$ and $33_4$ are supplied to a "+1" end of a word address counter 38 through an OR circuit 37a, and outputs from the one-shot circuits $31_5$ and $31_6$ and the AND circuits $33_5$ and $33_6$ are supplied to a "−1" end of the word address counter 38 through an OR circuit 37b. Count value set data from the control section 12 or an operation circuit 39 is supplied to the initial address counter 36 and the word address counter 38. Further, memory address set data is supplied from a bookmark memory 40 to the word address counter 38. Reading and writing at the initial address counter 36, the word address counter 38 and the bookmark memory 40, respectively, are controlled by read/write signals R/W1, R/W2 and R/W3 which are supplied from the control section 12. When the initial address counter 36 and the word address counter 38 simultaneously receive set data and a count signal, the set data has a priority over the count signal so that data is set at the initial address counter 36 and the word address counter 38. The count contents of the initial address counter 36 and the word address counter 38 are supplied to the operation circuit 39 which, in turn, supplies the data to the address decoder 19 shown in FIG. 2. The count content of the word address counter 38 is further supplied to the bookmark memory 40. Further, an operation control signal which specifies addition or subtraction is supplied from the control section 12 to the operation circuit 39. The operation circuit 39 also receives the ten key data through an input buffer 41. To the input buffer 41 is read in data which directly accesses an address for the first and second memories 20 and 21 corresponding to the number entered by the ten keys.

Figure 6:
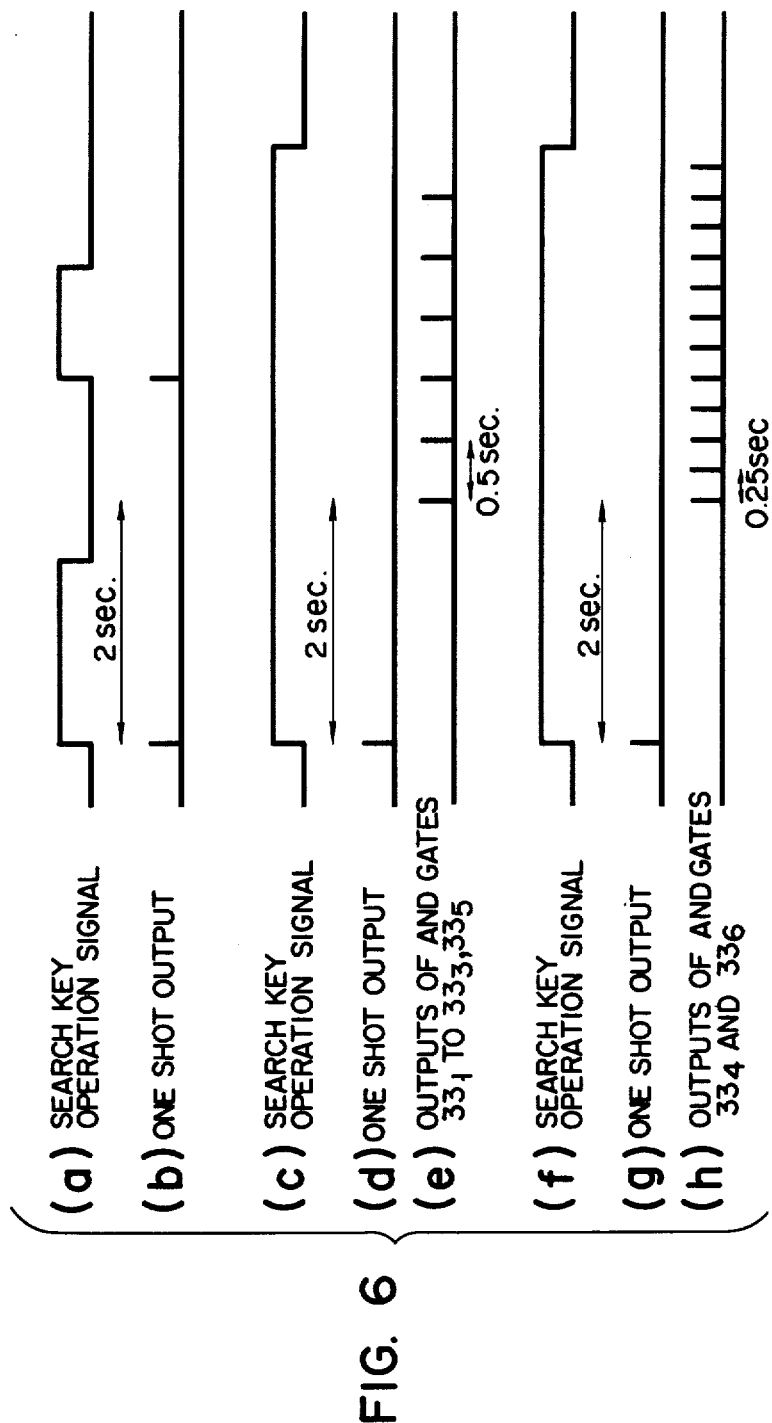
FIG. 6 is a timing chart for explaining the mode of operation of the search control section 16.

The search control section 16 with the above arrangement in the translation mode, operates in response to the key input signals c to h which respectively correspond to the "IN", "RE", " ▼ ", " ▼ ▼ ", " ▲ " and " ▲ ▲ " keys at the keyboard 3 through the key judging section 11, so that the search control section 16 controls the search for the first and second dictionary memories 20 and 21. When the total depression period with the keys described above is less than 2 seconds, the first and second dictionary memories 20 and 21 are searched one word upon each depression operation thereof. When the total depression period is more than 2 seconds, the first and second dictionary memories are searched at intervals of 0.5 or 0.25 second after the first two seconds. As shown in FIG. 6a, if the total depression period is less than 2 seconds, the outputs of level "0" are supplied from the delay circuits $32_1$ to $32_6$ to the AND circuits $33_1$ to $33_6$ which are then rendered nonconductive. Therefore, as shown in FIG. 6b, only one-shot pulse signals which are output from the one-shot circuits $31_1$ to $31_6$ are supplied to the initial address counter 36 or the word address counter 38 in accordance with the key-in operations as shown in FIG. 6b. The initial address counter 36 and the word address counter 38 perform a count operation every time a key-in operation is performed, so that the first and second dictionary memories 20 and 21 are searched. When the "IN", "RE", " ▼ " and " ▲ " keys are continuously depressed for two or more seconds, as shown in FIG. 6c, the one-shot pulse signals are output from the one-shot circuits $31_1$ to $31_3$ and $31_5$ at the leading edge of the key input signal, as shown in FIG. 6d. After two seconds, the outputs from the delay circuits $32_1$ to $32_3$ and $32_5$ are supplied to the AND circuits $33_1$ to $33_3$ and $33_5$ which are then rendered conductive. Therefore, the clock pulses $\phi_1$ having a period of 0.5 second as shown in FIG. 6e are supplied from the AND circuits $33_1$ to $33_3$ and $33_5$ to the initial address counter 36 and the word address counter 38. Therefore, the initial address counter 36 and the word address counter 38 search the first and second dictionary memories 20 and 21 every time a key is depressed. When the first two seconds elapse, the first and second memories 20 and 21 are searched every 0.5 second. Further, as shown in FIG. 6f, when the " ▼ ▼" and " ▲ ▲ " keys are continuously depressed for more than 2 seconds, the one-shot pulses are output from the one-shot circuits $31_4$ and $31_6$ at the leading edge of the key input signal, as shown in FIG. 6g. After the first two seconds, the outputs from the delay circuits $32_4$ and $32_6$ are supplied to the AND circuits $33_4$ and $33_6$ which are then rendered conductive. Therefore, the clock pulses $\phi_1$ having a period of 0.25 sec are supplied from the AND circuits $33_4$ and $33_6$ to the initial address counter 36 and the word address counter 38. The initial address counter 36 and the word address counter 38 search the first and second dictionary memories 20 and 21 once only when a key is depressed. In two seconds after the key is depressed, the initial address counter 36 and the word address counter 38 search the first and second dictionary memories 20 and 21 every 0.25 second.

Figure 7:
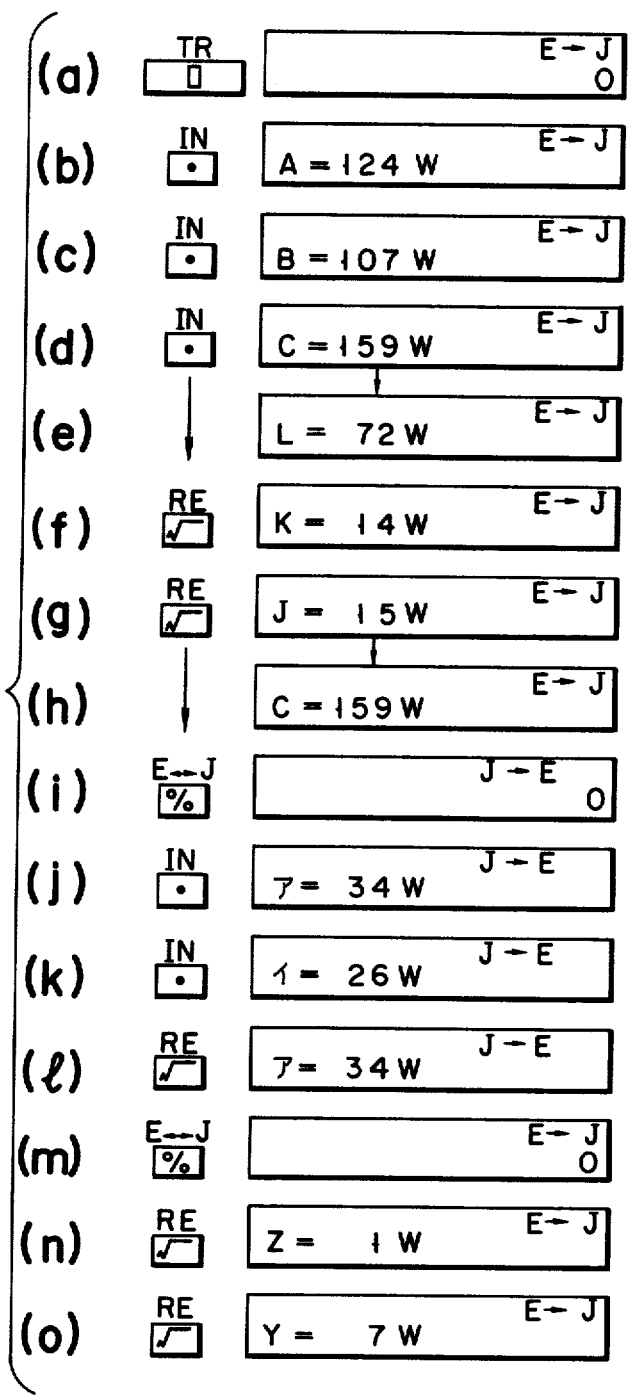
FIGS. 7a to 7o are views for explaining key-in operations in the initial search mode and changes in display contents corresponding to the key-in operations described above.

The mode of translating operation of the electronic dictionary with the above arrangement according to the embodiment of the present invention will be described. The mode of operation of the initial search will be described with reference to FIG. 7 first. In order to initiate the translation mode, as shown in FIG. 7a, the mode changeover switch 6 is set to the position for the translation mode TR. When the translation mode TR is specified by the mode changeover switch 6, a signal which specifies the translation mode is supplied from the key judging section 11 of FIG. 2 to the control section 12. The signal a which becomes level "1" in the translation mode is supplied from the key judging section 11 to the one-shot circuit 13. At the leading edge of the signal a, the one-shot pulse is supplied from the one-shot circuit 13 to the binary counter 15, so that the binary counter 15 is reset. In this condition, the control section 12 supplies display data which indicates the translation mode from English to Japanese "E→J" from the output line 12a of the control section 12 to the display selection section 17. The display data for "E→J" is then transferred from the display selection section 17 to the character generator 22 in which the display data is converted to dot matrix pattern data. The converted data is supplied to the liquid crystal driving section 24 through the display buffer 23. The liquid crystal display section 2 is driven by the liquid crystal driving section 24. Therefore, the translation mode "E→J" is displayed at the translation mode display section 2a, as shown in FIG. 7a. When the initial search is to be performed, the "IN" (initial) key is depressed as shown in FIG. 7b. When the "IN" key is depressed, the control section 12 operates in response to the key input signal from the key judging section 11, so that the control signal and set data are supplied to the search control section 16 through the output line 12d. The control section 12 specifies writing by the read/write signal R/W1 for the initial address counter 36 of the search control section 16, the detail of which is shown in FIG. 3. Further, the control section 12 supplies initial start address data "EI1" as the set data to the first dictionary memory 20. In this manner, the address "EI1" is set in the initial address counter 36. Simultaneously, the signal c which becomes level "1" only for a period in which the "IN" key is being depressed, is supplied from the key judging section 11 to the search control section 16. The one-shot pulse signal is output from the one-shot circuit $31_1$ and supplied to the "+1" end of the initial address counter 36 through the OR circuit 35a. As described above, when the set operation of data is performed, the unitary count-up operation is not performed at the initial address counter 36. The data which is set in the initial address counter 36 is supplied to the address decoder 19 and decoded in response to the control signal from the control section 12. An output from the address decoder 19 accesses the start address "EI1" of the first dictionary memory 20. The content "A=124W" which is stored in the first memory area 20a is read out by accessing this address. The readout data is supplied to the display selection section 17. In the translation mode from English to Japanese, the display selection section 17 selects the output from the first dictionary memory 20 in accordance with the instruction from the control section 12 until the "TR" (translation) key is depressed. Data which is read out from the first dictionary memory 20 is supplied to the character generator 22 through the display selection section 17. As a result, as shown in FIG. 7b, the storage content "A=124W" which is stored in the first memory area 20a is displayed at the liquid crystal display section 2. This display indicates that the words which begin with the letter A, numbering 124, are stored. In this condition, as shown in FIG. 7c, when the "IN" key is depressed, the signal c is supplied from the key judging section 11 to the search control section 16 as described above. When the search control section 16 receives the signal c, the one-shot circuit $31_1$ starts operating and the one-shot pulse signal is supplied to the "+1" end of the initial address counter 36 through the AND circuit 35a. The count value of the initial address counter 36 is incremented by 1, so that the count value thereof becomes 2. By this unitary incrementing operation in the initial address counter 36, the next address "EI2" for the first dictionary memory 20 is accessed, so that the storage content thereof "B=107W" is read out to the display selection section 17. As a result, "B=107W" is displayed at the liquid crystal display section 2, as shown in FIG. 7c. In the same manner as described above, every time the "IN" key is depressed, the subsequent address for the first dictionary memory 20 is accessed and the storage content thereof is read out. As a result, as shown in FIGS. 7d to 7e, initial data such as "C=159W" to "L=72W" are displayed at the liquid crystal display section 2. In this case, each time the "IN" key is continuously depressed for less than 2 seconds, the count value of the initial address counter 36 is incremented by 1, and the subsequent address for the first dictionary memory 20 is accessed. However, when the "IN" key is continuously depressed for more than 2 seconds, as described above, the count value of the initial address counter 36 is incremented by 1 at every interval of 0.5 second after the first 2 seconds since the "IN" key is depressed. Therefore, the initial data which is displayed at the initial address counter 36 is updated every 0.5 second.

When the initial search is to be performed in the reverse direction, the "RE" (reverse) key is depressed. Assume that the initial search is performed from A to L as shown in FIG. 7e and the "RE" key is depressed as shown in FIG. 7f. When the "RE" key is depressed, the signal d is output from the key judging section 11 to the search control section 16. When the search control section 16 receives the signal d, the one-shot pulse signal is output from the one-shot circuit $31_2$ and supplied to the "−1" end of the initial address counter 36 through the OR circuit 35b. The count value of the initial address counter 36 is decremented by 1, and the address for initial letter "K" immediately before the initial letter "L" in the first dictionary memory 20 is accessed. The initial data "K=14W" for the initial letter K is read out from first dictionary memory 20 and displayed at the liquid crystal display section 2 as shown in FIG. 7f. In the same manner as described above, every time the "RE" key is depressed, the count value of the initial address counter 36 is decremented by 1, and the content of the address immediately before the current address is sequentially read out from the first dictionary memory 20 and is displayed at the liquid crystal display section 2, as shown in FIGS. 7g and 7h. FIG. 7g shows initial data for the letter J, "J=15W"; and FIG. 7h, initial data for the letter C, "C=159W". When the "RE" key is continuously depressed for a perid of less than 2 seconds, the count value of the initial address counter 36 is decremented by 1 every time the "RE" key is depressed, so that the address immediately before the current address of the first dictionary memory 20 is accessed. However, when the "RE" key is continuously depressed for a period of more than 2 seconds, as described above, the count value of the initial address counter 36 is sequentially decremented by the clock pulse φ1 at intervals of 0.5 second after the first two seconds since the "RE" key is depressed. For this reason, the initial data which is sequentially displayed at the liquid crystal display section 2 is sequentially updated every 0.5 second in the reverse direction, that is, toward the first initial A. In this manner, the initial search in the reverse direction is performed.

The initial search for English is described above. As for Japanese, when the initial search is performed, as shown in FIG. 7i, the "E←→J" key is depressed to switch the translation mode from "E→J" to "J→E". In the translation mode from English to Japanese as described above, when the "E←→J" key is depressed, the signal b which becomes level "1" only for a period in which the "E←→J" key is depressed is supplied to the AND circuit 14. In this case, the signal a which is output from the key judging section 11 is supplied to the AND circuit 14, so that the AND circuit 14 outputs the signal "1" and the operation of the binary counter 15 is inverted. As a result, the binary counter 15 outputs the signal "1" which is supplied to the control section 12. Therefore, the control section 12 specifies the translation mode "J→E" and the display data for the translation mode "J→E" is supplied to the display selection section 17. The liquid crystal display section 2 displays "J→E" as shown in FIG. 7i. The control section 12 supplies, to the display selection section 17, the control signal which specifies the selection of the output from the second dictionary memory 21 through the output line 12a. In this condition, since an address for the second dictionary memory 21 is not accessed, the display at the liquid crystal display section is "0". When the "IN" key is depressed as shown in FIG. 7j under this condition, the key input signal corresponding to the "IN" key is supplied from the key judging section 11 to the control section 12. After the translation mode is switched to "J→E", the control section 12 specifies the initial start address data "JI1" to the initial address counter 36 upon the first depression of the "IN" key. Further, the control section 12 supplies the write/read signal R/W1 to the initial address counter 36. Therefore, the address data "JI1" is set in the initial address counter 36. This data in the initial address counter 36 is supplied to the address decoder 19 in which the data is decoded. In accordance with the decoded output from the address decoder 19, the initial start address "JI1" of the second dictionary memory 21 is accessed. The storage content "ア=34 W" which is stored in the first memory area 21a is read out and transmitted to the display selection section 17. Since the display selection section 17 is switched to the mode in which the second dictionary memory 21 is selected by the control signal from the control section 12 as described above, data which is read out from the second dictionary memory 21 is selected and transferred to the character generator 22. Therefore, the initial data "ア=34 W" is displayed at the liquid crystal display section 2, as shown in FIG. 7j. Subsequently, when the "IN" key is depressed, as shown in FIG. 7k, the signal c as described above is supplied from the key judge section 11 to the search control section 16. The count value of the initial address counter 36 is incremented by 1. The next address "JI2" of the second dictionary memory 21 is accessed, and the storage content "イ=26 W" is read out and displayed at the liquid crystal display section 2 in the manner as shown in FIG. 7k. In this condition, when the "RE" key is depressed as shown in FIG. 7l, the count value of the initial address counter 36 is decremented by 1 so that the address for the first kana character "ア" is accessed instead of the second kana character "イ" in the reverse direction. The initial data "ア=34 W" for the kana character "ア" is again displayed at the liquid crystal display section 2.

When the translation mode is to be switched again from "J→E" to "E→J", as shown in FIG. 7m, the "E←→J" key is depressed so that the operation of the binary counter 15 is reversed as described above. Therefore, the translation mode from English to Japanese is specified. In this case, the display data of "E→J" is supplied from the control section 12 to the display section 17 through the output line 12a. The translation mode from English to Japanese is displayed as "E→J" at the liquid crystal display section 2. Further, the control signal is supplied from the control section 12 to the display selection section 17 so that the first dictionary memory 20 is selected. In this manner, the mode of operation of the display selection section 17 is switched.

When the initial search is to be performed from the last letter Z instead of the first letter A, the "RE" key is depressed after the translation mode is switched as shown in FIG. 7m. The control section 12 supplies the initial end address "EI26" from the first dictionary memory 20 to the initial address counter 36 upon the first depression of the "RE" key. Further, the control section 12 supplies the read/write signal R/W1 to the initial address counter 36. Therefore, the address "EI26" is set in the initial address counter 36. The initial end address "EI26" of the first dictionary memory 20 is accessed through the address decoder 19. The initial data "Z=1W" for the last letter Z is read out from the first dictionary memory 20 and is displayed at the liquid crystal display section 2 as shown in FIG. 7n. When the "RE" key is depressed as shown in FIG. 7o, the count value of the initial address counter 36 is decremented by 1, so that the address for the letter Y immediately before the letter Z is accessed from the first dictionary memory 20. The initial data "Y=7W" for the initial letter Y is displayed at the liquid crystal display section 2. In the same manner as described above, every time the "RE" key is depressed, the initial search in the reverse direction, that is, toward the initial letter A is performed. Further, when the initial search for Japanese is to be performed from the last character, the same key-in operation is repeated to accomplish the initial search after the "E←→J" key is depressed. Thus, the last initial character "ン" is searched first.

Figure 8:
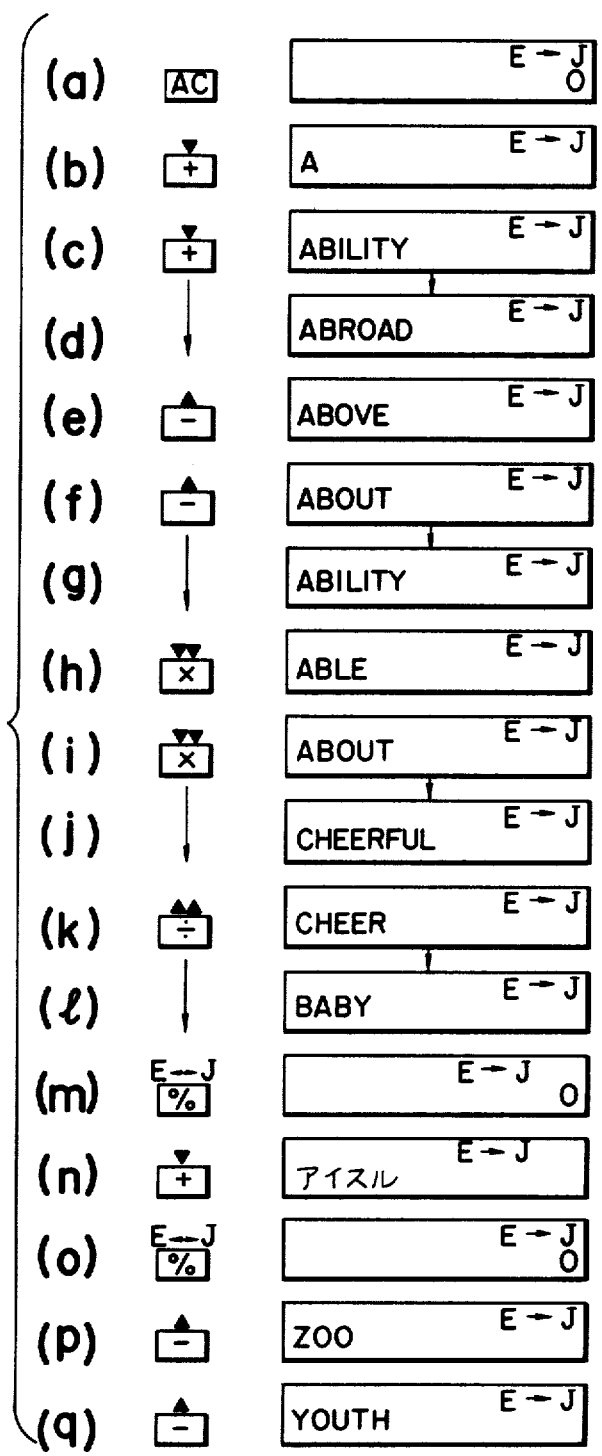
FIGS. 8a and 8q are views for explaining key-in operations in the word search mode and changes in display contents corresponding to the key-in operations.

The mode of operation of the word search which specifies each word will be described with reference to FIG. 8. The "AC" key is depressed as shown in FIG. 8a to set the search control section 16 in the initial status. In this initial status, the binary counter 15 is reset in response to the signal i so that the translation mode from English to Japanese is initiated. Subsequently, as shown in FIG. 8b, the "▼" key is depressed whereupon the control section 12 supplies the read/write instruction R/W2 to the word address counter 38. When the translation mode from English to Japanese is initiated, the word start address "EW1" of the first dictionary memory 20 is supplied to the word address counter 38. Therefore, data for the word start address "EW1" is set in the word address counter 38. The storage content "A" from the first memory area 21a of the first dictionary memory 20 is read out and displayed at the liquid crystal display section 2. Subsequently, when the "▼" key is depressed as shown in FIG. 8c, the signal e is supplied from the key judging section 11 to the search control section 16. In response to this signal, the one-shot pulse signal is output from the one-shot circuit 31₃ and supplied to the "+1" end of the word address counter 38 through the OR circuit 37a. The count value of the word address counter 38 is incremented by 1 and the next address of the first dictionary memory 20 is accessed. Therefore, the storage content for the accessed address, for example, "ABILITY" is read out and displayed at the liquid crystal display section 2. In this case, when the "▼" key is continuously depressed for a period of more than two seconds, the count value of the word address counter 38 is incremented by 1. Further, the count value of the word address counter 38 is sequentially incremented by 1 every 0.5 seconds in the same manner as described above by the clock pulse φ1 after two seconds since the "▼" key is depressed. Therefore, the storage contents are sequentially read out from the first dictionary memory 20 and displayed at the liquid crystal display section 2 in the manner as shown in FIGS. 8c to 8d. Further, when the "▲" key is depressed as shown in FIG. 8e, the count value of the word address counter 38 is decremented by 1 so that the address immediately before the current address in accessed and data, for example, "ABOVE" is read out from the first dictionary memory 20 and displayed at the liquid crystal display section 2. When the "▲" key is continuously depressed for a period of more than two seconds, as shown in FIGS. 8f and 8g, the count value of the word address counter 38 is decremented by 1 immediately after the "▲" key is depressed. The count value of the word address counter 38 is sequentially decremented by 1 every 0.5 second by the pulse signal φ1 after two seconds since the "▲" key is depressed. Therefore, the word search in the reverse direction is performed. Further, when the "▼▼" key is depressed for a period of less than two seconds, as shown in FIG. 8h, in the same operation mode as "▼" key, the count value of the word address counter 38 is incremented by 1 so that the address immediately after the current address of the first dictionary memory 20 is accessed. On the other hand, when the "▼▼" key is continuously depressed for a period of more than two seconds, as shown in FIGS. 8i and 8j, the count value of the word address counter 38 is incremented by 1. Further, after two seconds, the AND circuit 33₄ is rendered conductive in response to the output from the delay circuit 32₄, so that the count value of the word address counter 38 is sequentially incremented by 1 every 0.25 second by the clock pulse φ2. The storage content of the first dictionary memory 20 is read out at a speed twice the speed for the depression of the "▼" key, only for a period in which the "▼▼" key is being depressed. The readout data is displayed at the liquid crystal display section 2. Further, as shown in FIGS. 8k and 8l, when the "▲▲" key is continuously depressed for a period of more than two seconds, the count value of the word address counter 38 is decremented by 1 when the "▲▲" is depressed. After two seconds since the "▲▲" key is depressed, the count value of the word address counter 38 is sequentially decremented by 1 every 0.25 second by the clock pulse φ2. While the "▲▲" key is being depressed, the storage content of the first dictionary memory 20 is searched toward letter A at a speed twice the speed when the "▲" key is depressed and the searched content is displayed at the liquid crystal display section 2. On the other hand, when the word search for Japanese is to be performed, as shown in FIG. 8m, the "E←→J" key is depressed to initiate the translation mode from Japanese to English. The "▼" key is depressed as shown in FIG. 8n. The control section 12 operates to set the word start address "JW1" of the second dictionary memory 21 in the word address counter 38 when the "▼" key is first depressed after the translation mode is changed over. The storage content " ﾌｧｲﾙ " is read out from the first memory area 21a at the address JW1 of the second dictionary memory 21 and displayed at the liquid crystal display section 2. In the same manner as described above, every time the "▼" key is depressed, the next address of the second dictionary memory 21 is accessed and the storage content therein is read out and displayed at the liquid crystal display section 2. Further, when the word search is to be performed from the end address to the start address for English words, as shown in FIG. 8o, the "E←→J" key is depressed to change the translation mode to "E→J". Thereafter, as shown in FIG. 8p, the "▲" key is depressed. The control section 12 operates to set data for the word end address "EW2209" of the first dictionary memory 20 in the word address counter 38 by the key-in operation as described above. Therefore, the stored word "ZOO" at the end address of the first dictionary memory 20 is read out and displayed at the liquid crystal display section 2, as shown in FIG. 8p. Subsequently, as shown in FIG. 8q, the "▲" key is depressed, the count value of the word address counter 38 is decremented by 1 so that the address immediately before the current address is accessed and the stored word, for example, "YOUTH" is read out and displayed at the liquid crystal display section 2. The word search of a Japanese word from the end address is initiated by depressing the "E←→J" key. The subsequent operation is the same as in the word search for English. In this manner, the corresponding Japanese word for a desired English word is displayed at the liquid crystal display section 2.

A case is described in detail with reference to FIG. 9 in which translation is performed by the initial search and the word search. As shown in FIG. 9a, the "AC" key is depressed so that the search control section 16 is restored to the initial status. In this initial status, as described above, the translation mode from English to Japanese is specified. Thereafter, the "IN" key is depressed as shown in FIG. 9b. Thus, the initial data "A=124W" for the initial letter "A" is read out from the first dictionary memory 20 and displayed at the liquid crystal display section 2. Subsequently, as shown in FIG. 9c, when the "IN" key is depressed again, the initial data "B=107W" for the initial letter B at the next address is read out and displayed at the liquid crystal display section 2. For example, when a word which begins with the initial letter B is to be searched, the "▼" key is depressed as shown in FIG. 9d under the condition in which the data B=107W" is still displayed at the liquid crystal display section 2. In this condition, the control section 12 reads out the storage content at an address of the second memory area 20b which is currently accessed, that is, the word address data "EW125". The readout data is set in the word address counter 38. Therefore, the word "BABY" which is stored at the address "EW125" in the second dictionary memory 21 is read out and supplied to the display selection 17. In this condition, the display selection section 17 selects the second dictionary memory 21 in response to the control signal from the control section 12, so that data for the word "BABY" which is read out from the second dictionary memory 21 is transferred to the character generator 22 through the display selection section 17. Thus, the data transferred to the character generator 22 is supplied to the liquid crystal display section 2 and displayed in the manner as shown in FIG. 9d. When the "C" key is depressed during the word search, the initial address counter 36 is selected at the address decoder 19, so that the initial display condition is restored as shown in FIG. 9e. Further, when the "▲" key is depressed in this condition as shown in FIG. 9f, the storage content "EW125" which is stored in the word address counter 38 is decoded in the address decoder 19. Therefore, the address of the first dictionary memory 20 storing the storage content of "EW124" is accessed. The storage content "AWAY", for example, is read out from the address "EW124" of the first dictionary memory 20 and displayed at the liquid crystal display section 2. In the same manner as described above, when the "▲" key is depressed, the word search in the reverse direction is performed as shown in FIG. 9g. On the other hand, when the word search in the forward direction is to be performed, the "▼" key is depressed as shown in FIG. 9h. In this case, when the "▼" key is continuously depressed as shown in FIGS. 9h and 9i, the display is advanced by one word. Further, after two seconds since the "▼" key is depressed, the subsequent word is searched and displayed every 0.5 second. By utilizing these functions, that is, the initial search and the word search, a desired word is searched and this word is displayed. When the desired word is displayed, the key-in operation is interrupted. As shown in FIG. 9j, the "TR" key is then depressed. Assume that the word "MOVE" is searched and displayed, and the "TR" key is depressed under this condition. The control section 12 reads out the word address "JW72" for the Japanese word corresponding to the storage content, that is, "MOVE" at the specified address of the second memory area 20b of the first dictionary memory 20. The control section 12 further accesses the address "JW72" of the second dictionary memory 21 through the address decoder 19. Therefore, a translated word " ウゴﾞク " corresponding to the word "MOVE" is read out from the second dictionary memory 21 and selected at the display selection section 17. The selected data is displayed at the liquid crystal display section 2.

When a Japanese word is to be translated to a corresponding English word, as shown in FIG. 9k, the "E←→J" key is depressed so that the translation mode from Japanese to English is initiated. As shown in FIG. 9l, the "IN" key is depressed, so that the initial data " ｱ =34 words" for the initial character " ｱ " is read out from the second dictionary memory 21. In this condition, when the "IN" key is continuously depressed for the period of more than two seconds, the first initial " ｱ " is displayed as shown in FIG. 9l. Subsequently, after two seconds since the "IN" key is depressed, the initial search is performed every 0.5 second. Assume that a desired word has the kana character " ｳ " as an initial character. When the initial character " ｳ " is displayed, the key operation is interrupted, as shown in FIG. 9m. Thereafter, as shown in FIGS. 9n and 9o, the "▼" key is continuously depressed. In the same manner as in the word search with the "▼" key, as described above, word data for the initial character " ｳ " is sequentially read out from the second dictionary memory 21 and is displayed at the liquid crystal display section 2. When the desired word, for example, " ｳｻｷﾞ " is displayed at the liquid crystal display section 2, the above key operation is interrupted. The "TR" key is then depressed. When the "TR" key is depressed, the control section 12 reads out the word address "EW1498" which corresponds to the Japanese word " ｳｻｷﾞ " which is stored at the specified address in the second memory area 21b of the second dictionary memory 21. The control section 12 further accesses the address of the first dictionary memory 20 through the address decoder 19. Therefore, the translated word "RABBIT" which corresponds to the Japanese word " ｳｻｷﾞ " is read out from the first dictionary memory 20 and displayed at the liquid crystal display section 2, as shown in FIG. 9p. In this case, as shown in FIG. 9q, if the "TR" key is depressed again, in the same manner as described above, the translated word " ｳｻｷﾞ " for the English word "RABBIT" is read out from the second dictionary memory 21 and displayed at the liquid crystal display section 2. Further, in this condition, if a predetermined search key-in operation is performed, the search operation in the search control section as described above is performed, and the corresponding data is displayed at the liquid crystal display section 2.

The mode of operation of initial data search and the word data search by specifying desired address by the ten keys will be described with reference to FIG. 10. In the initial search mode, as shown in FIG. 10a, the "AC" key is depressed to restore the initial status. A desired number, for example, 2 is entered with ten keys 4 as shown in FIG. 10b. Thereafter, the "IN" key is depressed as shown in FIG. 10c. In this manner, when the ten keys 4 are depressed in the translation mode, data which is entered by the ten keys 4 is supplied from the control section 12 to the search control section 16 of FIG. 3 and stored in the input buffer 41. The ten key data is also supplied from the control section 12 to the character generator 22 through the output line 12a and the display selection section 17, and displayed at the liquid crystal display section 2. In this condition, when the "IN" key is depressed as described above, the read-/write instruction R/W1 is supplied from the control section 12 so that the numeric data "2" which is retained in the input buffer 41 is written in the initial address counter 36 through the operation circuit 39. Further, a code for EI is output from the control section 12 and set in the initial address counter 36. As a result, the code "EI2" is set in the initial address counter 36. Therefore, the initial address E12 of the first dictionary memory 20 is accessed through the address decoder 19. The initial data "B=107W" for the initial letter "B" is read out from the first dictionary memory 20 and displayed at the liquid crystal display section 2, as shown in FIG. 10c. Alternatively, when numeric data "14" is entered by the ten keys 4 as shown in FIG. 10d and then the "IN" key is depressed as shown in FIG. 10e, the address "EI14" of the first dictionary memory 20 for the initial letter "N" is accessed and the initial data, for example, "N=52W" is read out from the first dictionary memory 20 and displayed at the liquid crystal display section 2. When a specific word which begins with the initial letter "N" is to be searched, a specific address is accessed by entering numeric data such as "12" with the ten keys 4 as shown in FIG. 10f, and the "▼" key is then depressed as shown in FIG. 10g. The ten key data is supplied from the control section 12 to the input buffer 41 and retained in the input buffer 41. When the "▼"

key is depressed, the word address "EW1680" for the initial letter "N", that is, the storage content of the second memory area 20b at the specified address of the first dictionary memory 20 is read out. This readout data is set in the word address counter 38 through the control section 12. The data which is set in the word address counter 38 is further supplied to the operation circuit 39 and is added to the numeric data "12" which is retained in the input buffer 41 in response to the operation control signal from the control section 12. The addition result is supplied to the word address counter 38 and set in the word address counter 38. An address of the first dictionary memory 20 is accessed according to the data which is set in the word address counter 38. Then, the 12th word from the first word of the words beginning with the letter "N", for example, "NEED" is read out from the first dictionary memory 20 and displayed at the liquid crystal display section 2.

When an address for a word which begins with the initial letter "A" is to be accessed, the initial search need not be required. As shown in FIG. 10h, after the "AC" key is depressed, desired numeric data, for example 40, which corresponds to the 40th address is entered by the ten keys 4, as shown in FIG. 10i. Thereafter, as shown in FIG. 10j, the "▼" key is depressed. Thus, the ten key data "40" together with the "EW" code from the control section 12 is set in the word address counter 38 through the input buffer 41 and the operation circuit 39. The 40th address from the beginning in the first dictionary memory 20 is accessed, and the storage content at the 40th address, that is, "AID" is read out and displayed at the liquid crystal display section 2. In the same manner as shown in FIG. 10k, the "AC" key is depressed, and the 25th address is specified by entering numeric data "25" with the ten keys 4 as shown in FIG. 10l. Subsequently, the "▼" key is depressed as shown in FIG. 10m, so that the 25th address in the first dictionary memory 20 is accessed and the storage content, for example, "ADD" is read out and is displayed at the liquid crystal display section 2. In this condition, as shown in FIG. 10n, when the "▼" key is depressed, the count value of the word address counter 38 is incremented by 1 and the storage content at the next address, that is, "ADDRESS" is read out and displayed at the liquid crystal display section 2. In this condition, desired numeric data, for example, "6" is entered by the ten keys 4, as shown in FIG. 10o, and subsequently the "▼" key is depressed as shown in FIG. 10p. Then, the ten key data "6" and the count value of the word address counter 38 are added. The addition data is set in the word address counter 38 again. Therefore, the sixth address from the address for the word "ADDRESS" in the first dictionary memory 20 is accessed. Therefore, the storage content, for example, "ADVANTAGE" at the sixth address from the address for the word "ADDRESS" is read out and displayed at the liquid crystal display section 2. In this manner, numeric data is entered by the ten keys 4 and the "▼" key is then depressed while a word is displayed at the liquid crystal display section 2, so that the addresses are advanced for the addresses which correspond to the numeric data in number and the storage content at the advanced address is read out and displayed. The initial data search and the word data search by specifying the desired address in the translation mode from Japanese to English may also be performed in the same manner as described above.

Figure 11:
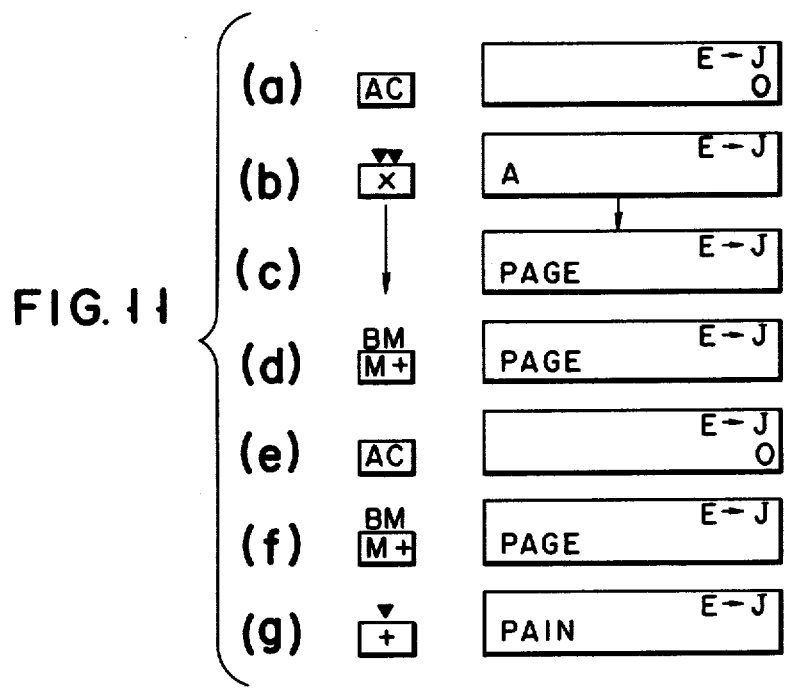
FIGS. 11a to g are views for explaining key-in operations and changes in display contents corresponding to the key-in operations for a bookmark storage operation.

The storage mode for the bookmark will be described with reference to FIG. 11. This bookmark function is the same as the function in which a bookmark is used to mark the page of a book which is being read. When English words are to be memorized from the beginning, the bookmark function is used. For example, as shown in FIG. 11a, the "AC" key is depressed to restore the initial status. Thereafter, the key-in operations such as depressing of the "▼ ▼" key or the like is performed to carry out the word search. When English words are sequentially displayed at the liquid crystal display section 2 in order to memorize English words, and this process is to be interrupted at the current word "PAGE" which is displayed at the liquid crystal display device 2, the "BM" (bookmark) key is depressed as shown in FIG. 11d. When the "BM" key is depressed, the read/write instruction R/W3 is supplied from the control section 12 to a bookmark memory 40. Word address data for the word "PAGE", that is, the count value of the address counter 38 at the current position is written in the bookmark memory 40. In this manner, an operation of bookmark memory is performed by depressing the "BM" key. When the memorizing process is to be started later on, the "AC" key is depressed first in the translation mode, as shown in FIGS. 11e and 11f, and then the "BM" key is depressed. Upon these key-in operations, the read/write instruction R/W2 is supplied from the control section 12 to the word address counter 38, and the read/write instruction R/W3 is supplied from the control section 12 to the bookmark memory 40. Therefore, the address for "PAGE" is read out and written in the word address counter 38. Subsequently, the read/write instruction R/W2 is output from the control section 12 and the count value of the word address counter 38 is read out to the address decoder 19. In this way, the address in the first dictionary memory 20 is accessed. The word data "PAGE" is read out from the first dictionary memory 20 and displayed at the liquid crystal display section 2 as shown in FIG. 11f. In this condition, as the "▼" key is depressed as shown in FIG. 11g, the word search following the word "PAGE" is performed.

When the calculation mode (CAL) is specified by the mode changeover switch 6 on the keyboard 3, in accordance with the key-in operations by the ten keys 4 and the function keys 5, the control section 12 supplies the control signal and the operation data to the operation/memory section 18 in which a predetermined operation is performed. In this case, the entry data and the operated data are stored and retained in the operation/memory section 18 and supplied to the character generator 22 through the display selection section 17. The data which is supplied to the character generator 22 is displayed at the liquid crystal display section 2.

In the above embodiment, the address JW is stored in the second memory area 20b of the first dictionary memory 20. However, the corresponding Japanese words as shown in FIG. 12 may be written in the second memory area 20b of the first dictionary memory 20. Further, in the above embodiment, Japanese words and address EW are written in the first and second memory areas 21a and 21b of the second dictionary memory 21. However, the address EW corresponding to the Japanese word which is written in the second memory area 20b may be rearranged in the order of kana characters and may be written in the second memory area 21b, as shown in FIG. 13. With this arrangement, only small storage areas are required.

What we claim is:

1. an electronic dictionary which translates a word from a source language to an object language by key control and displays the word on a display section, comprising:

key input means including at least one forward key and at least one reverse key, and a translation key;

memory means for storing words of the source language in an order of word arrangement corresponding to that of a dictionary, and for storing words of the object language, wherein the stored words have associated addresses;

word search means coupled to said key input means and to said memory means for specifying the addresses of the words of the source language stored in said memory means, and for enabling the display of the words of the source language on the display section, wherein said word search means specifies said addresses sequentially in a forward order of the stored word arrangement in response to operation of said forward key, and specifies said addresses sequentially in a reverse order of the stored word arrangement in response to operation of said reverse key; and translation means coupled to said key input means and to said memory means for selecting from said memory means that word of the object language which corresponds to the translation of the word of the source language in response to operation to said translation key wherein said translation means is operative to specify the address of the word of the object language, and for enabling the display of the word of the object language the address of which is specified, on the display section.

2. An electronic dictionary according to claim 1, wherein said word search means includes means which outputs one control signal for each operation of either of said forward key and said reverse key, means for outputting a clock pulse of a specified period during an interval of continued operation of either of said forward and said reverse key, and means for designating a selected one of a forward and a reverse direction of advance of the addresses of the words of the source language stored in said memory means in response to each output of said control signal and said clock pulse.

3. An electronic dictionary according to claim 1, wherein said key input means includes first and second forward keys and first and second reverse keys, and said word search means includes means which outputs one control signal for each operation of any of said forward keys and said reverse keys, generator means for providing a clock pulse of a specified period during an interval of continued operation of either of the first forward key and the first reverse key, and for providing a clock pulse of a period longer than said specified period during an interval of continued operation of either of the second forward key and the second reverse key, and means for designating a selected one of a forward and the reverse direction of advance of the addresses of the words of the source language stored in said memory means in response to each output of said control signal and said clock pulse.

4. An electronic dictionary which translates a word from a source language to an object language by key control and displays the word on a display section, comprising:

key input means including at least one word search key and at least one initial search key, and a translation key;

memory means for storing words and initial letters of the source language in an order of word arrangement corresponding to that of a dictionary, and for storing words of the object language, wherein the stored words and initial letters have associated addresses;

initial letter search means coupled to said key input means and to said memory means for specifying sequentially in said order of word arrangement the addresses of the initial letters stored in said memory means in response to operation of said initial search key, and for enabling the display of the initial letters on the display section in said order of word arrangement;

word search means coupled to said key input means and to said memory means for specifying sequentially each address of words of the source language stored in said memory means in response to operation of said word search key, for specifying an address of the first word of the source language which begins with the initial letter the address of which is specified by said initial letter search means when said initial search key is operated, in response to operation of said word search key and after the operation of said initial search key, and for displaying a word of the source language on the display section in said order of word arrangement; and translation means coupled to said key input means and to said memory means for selecting from said memory means that word in the object language which corresponds to a translation of the word in the source language, in response to operation of said translation key, wherein said translation means is operative to specify the address of the word in the object language, and for enabling the display of the word of the object language the address of which is specified, on the display section.

5. An electronic dictionary according to claim 4, wherein said key input means includes a forward initial search key and a reverse initial search key, and said initial letter search means is operative to specify sequentially a forward advance in the address of the initial letters stored in said memory means in said order of word arrangement in response to operation of said forward initial search key, and to specify sequentially a reverse direction in the address of said initial letters in response to operation of said reverse initial search key.

6. An electronic dictionary according to claim 4, wherein said initial letter search means includes means for providing one control signal for each operation of said initial search key, generator means for providing a clock pulse of a specified period during an interval of continued operation of said initial search key, and means for specifying sequentially an advance of the addresses of the initial letters stored in said memory means in response to each output of said control signal and said clock pulse.

7. An electronic dictionary according to claim 4, wherein said memory means is operative to store said initial letters and words of the source language which begin with each of said initial letters, and said initial letter search means is operative to specify sequentially said initial letters stored in said memory means and the address of the word of the source language which begins with the specified initial letter, in response to operation of said initial search key.

8. An electronic dictionary which translates a word from a source language to an object language by key control and displays the word on a display section, comprising:
- key input means including at least a word search key, a translation key and number keys for inputting numeral data;
- memory means for storing words of the source language and words of the object language in an order of word arrangement corresponding to that of a dictionary, wherein the stored words have associated addresses;
- word search means coupled to said key input means and to said memory means for specifying sequentially in said order of word arrangement the addresses of the words of the source language stored in said memory means in response to operation of said word search key, and for addressing that word of the source language which has an address value equal to an added value of numeral data inputted by said number keys and a currently specified address of a stored word, in response to operation of said word search key after operation of said number keys;
- translation means coupled to said key input means and to said memory means for selecting from said memory means that word in the object language which corresponds to the translation of the word in the source language in response to operation of said translation key, wherein said translation means is operative to specify the address of the word of the object language, and for enabling the display of the word of the object language the address of which is specified, on the display section.

9. An electronic dictionary which translates a word from a source language to an object language by key control and displays the word on a display section, comprising:
- key input means including at least a word search key, a translation key, an initial search key, and number keys for inputting numeral data;
- memory means for storing words of the source language and words of the object language in an order of word arrangement corresponding to that of a dictionary, and for storing initial letters in an initial order, wherein the stored words and initial letters have associated addresses;
- initial letter search means coupled to said key input means and to said memory means for specifying sequentially the addresses of each of said initial letters stored in said memory means in response to operation of said initial search key, for enabling the display of the initial letters on the display section in said order of word arrangement, and for addressing that initial letter which has an address value equal to an added value of numeral data inputted by said number keys and a currently specified address of a stored initial letter in response to operation of said initial search key after operation of said number keys;
- word search means including means for displaying sequentially the stored words of the source language in said order of word arrangement, wherein said word search means is operative to specify sequentially the addresses of words of the source language stored in said memory means in response to operation of said word search key, means for specifying an address of the first word of those words of the source language which begin with the initial letter the address of which is specified by said initial search key when said initial search key is operated, in response to operation of said word search key after operation of said initial search key, and means for specifying the address of the word of the source language which has an address value equal to an added value of numeral data inputted by said number keys and a currently specified address value of a currently addressed word of the source language, in response to operation of said word search key after operation of said number keys; and
- translation means coupled to said key input means and to said memory means for selecting from said memory means that word in the object language which corresponds to the translation of the word in the source language in response to operation of said translation key, wherein said translation means is operative to specify the address of the word of the object language, and for enabling the display of the word of the object language the address of which is specified, on the display section.

10. An electronic dictionary which translates a word of a source language into a word of an object language by key control and displays the word on a display section, comprising:
- key input means including at least a word search key, a translation key and a bookmark key;
- memory means for storing the words of the source language and the words of the object language in an order of word arrangement corresponding to that of a dictionary;
- word search means coupled to said key input means and to said memory means for specifying sequentially the addresses of the words of the source language stored in said memory means in response to operation of said word search key, and for enabling the display of the word of the source language on the display section;
- control means coupled to said key input means and to said word search means for storing the address of a word the address of which has been specified by said word search means, and for providing the stored address to said word search means in response to a bookmark read out instruction by said bookmark key; and
- translation means coupled to said key input means and to said memory means for selecting from said memory means that word in the object language which corresponds to the translation of the word in the source language in response to operation of said translation key, wherein said translation means is operative to specify the address of the word of the object language, and for enabling the display of the word of the object language the address of which is specified, on the display section.

* * * * *

UNITED STATES PATENT AND TRADEMARK OFFICE
CERTIFICATE OF CORRECTION

Figure 3:
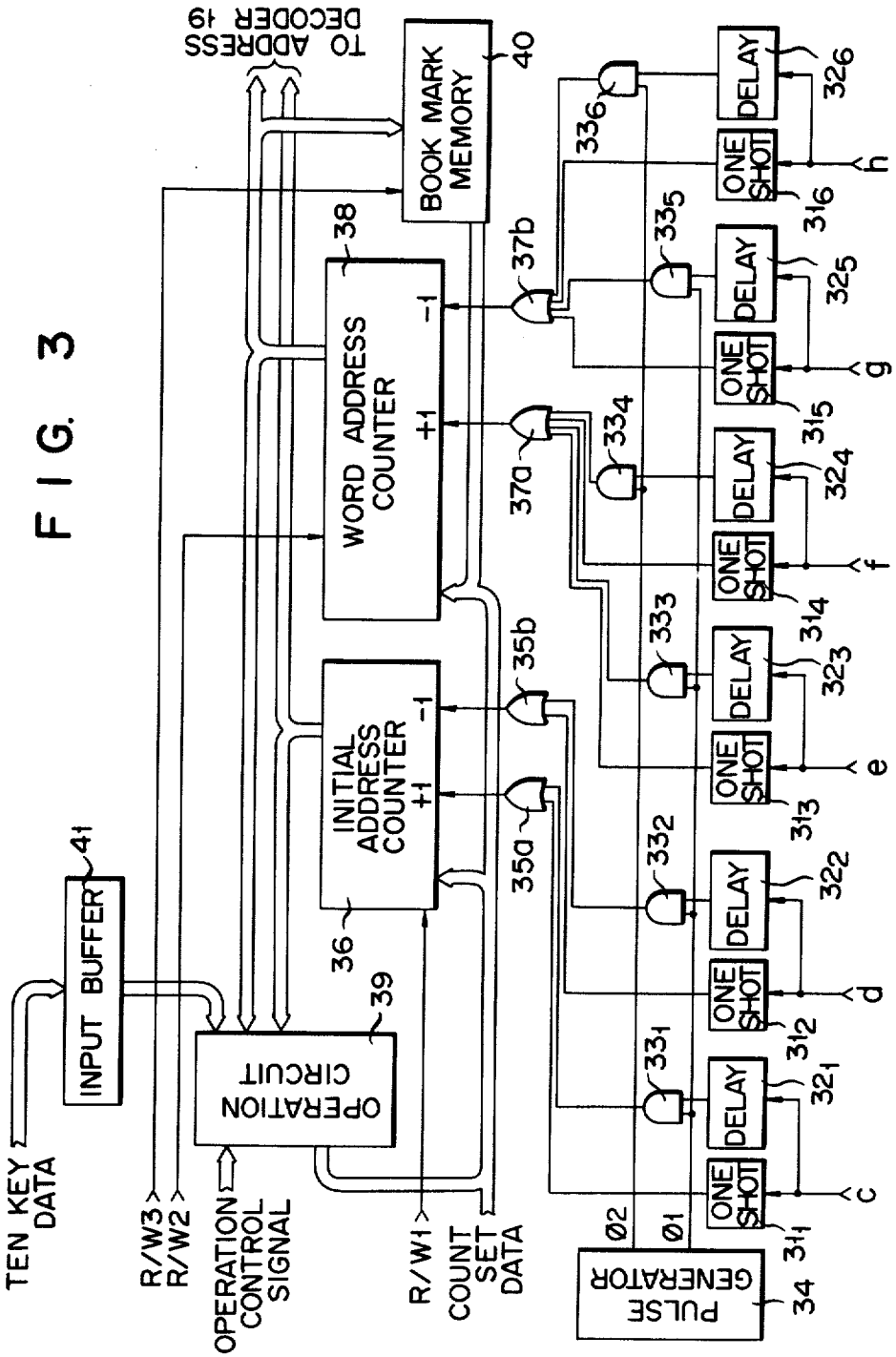
FIG. 3 is a detailed circuit diagram of a search control section 16 of FIG. 2.

PATENT NO.   :   4,481,607
DATED        :   November 6, 1984
INVENTOR(S)  :   Saburo KOBAYASHI et al It is certified that error appears in the above-identified patent and that said Letters Patent is hereby corrected as shown below:

COLUMN 4, line 1, after "reference to", the words "FIG. 2" should read --FIG. 3--;

COLUMN 6, line 59, after "clock pulses", the symbol "$\phi 1$" should read --$\phi 2$--.

Signed and Sealed this

Seventh Day of May 1985

[SEAL]

Attest:

DONALD J. QUIGG

Attesting Officer

Acting Commissioner of Patents and Trademarks